(12) United States Patent
Matsunaga

(10) Patent No.: US 6,564,177 B1
(45) Date of Patent: May 13, 2003

(54) ELECTRONIC DEVICE

(75) Inventor: Takanori Matsunaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/429,566

(22) Filed: Oct. 28, 1999

(30) Foreign Application Priority Data

May 12, 1999 (JP) .......................................... 11-131092

(51) Int. Cl.⁷ .............................................. G06F 9/445
(52) U.S. Cl. ............................ 703/21; 703/26; 703/27; 712/208; 711/6
(58) Field of Search ............................ 703/21, 26, 28, 703/27; 711/6, 212, 203; 712/208, 32

(56) References Cited

U.S. PATENT DOCUMENTS

| | | | | |
|---|---|---|---|---|
| 4,597,044 A | * | 6/1986 | Cirello ........................ | 364/200 |
| 4,761,733 A | * | 8/1988 | McCrocklin et al. ....... | 364/200 |
| 5,381,547 A | * | 1/1995 | Flug et al. ................... | 395/700 |
| 6,219,830 B1 | * | 4/2000 | Eidt et al. ...................... | 717/5 |
| 6,081,802 A | * | 6/2000 | Atherton et al. ................ | 707/3 |
| 6,148,391 A | * | 11/2000 | Petrick ......................... | 712/202 |

FOREIGN PATENT DOCUMENTS

| | | | | |
|---|---|---|---|---|
| JP | 9-146774 | 6/1997 | ........... | G06F/9/445 |

* cited by examiner

Primary Examiner—Kevin J. Teska
Assistant Examiner—T. Phan
(74) Attorney, Agent, or Firm—Sughrue Mion, PLLC

(57) ABSTRACT

An electronic device includes an operation processing unit, a main storage unit, a program storing ROM for storing a plurality of divided program codes and for storing loading program codes for loading the program codes to the main storage unit, an information table storing ROM for storing an information table having a description of information about the program codes to be loaded from the program storing ROM to the main storage unit, and a map management element having a description of virtual addresses in the main storage unit at which the program codes stored in the program storage element are mapped. As a result of this construction, only those program codes requiring quick response are loaded without loading all the program codes to the main storage unit and executed promptly, and thus the system activation time can be reduced.

9 Claims, 11 Drawing Sheets

FIG. 6

| ORDER | PROGRAM CODES TO BE LOADED | MAP MANAGEMENT 7a |
|---|---|---|
| 1 | (24a) | ADDRESS A |
| 2 | (25a) | ADDRESS B |
| 3 | (26a) | ADDRESS C |
| 4 | (27a) | ADDRESS D |
| AT THE TIME OF ABNORMALITY | (28a) | ADDRESS E |

FIG. 8

| TYPE | PROGRAM CODES TO BE LOADED | MAP MANAGEMENT |
|---|---|---|
| α | (34a) | ADDRESS A |
| β | (35a), (36b) | ADDRESS A |
| γ | (37a) | ADDRESS A |
| AT THE TIME OF ABNORMALITY | (38a) | ADDRESS E |

7b

ELECTRONIC DEVICE

BACKGROUND OF THE INVENTION

1. Field of the Invention

The present invention relates to an electronic device for executing programs stored in a main storage unit.

2. Description of the Related Art

For example, an electronic device, which executes a program by reading the program upon activation of a system into which the device is incorporated, loads all program codes to a main storage unit from a program storing secondary storage unit such as a flash ROM and thereafter starts a process upon activation of the system.

FIG. 10 is a diagram showing the construction of the main portion of such an electronic device disclosed in, e.g., Japanese Patent Application Laid Open No. Hei 9-146774 and the like, and FIG. 11 is a flowchart showing the operation at the time of its setup.

As shown in FIG. 10, this conventional example includes a central processing unit (CPU) 1 for reading and executing a program, an activation ROM 2, such as a flash memory, for storing an activation program, a program storing ROM 3 for storing programs such as controlling programs, and a main storage unit 4 such as a DRAM.

Next, the operation of the conventional example will be described with reference to the flow chart shown in FIG. 11. First, when power is turned on (step S1), the CPU 1 executes the activation program stored in the activation ROM 2 (step S2), initializes hardware (H/W) (step S3), loads program codes to the main storage unit 4 from the program storing ROM 3 (step S4), and executes programs (step S5) to thereby activate the system.

However, such a conventional example has addressed the following problems.

(1) Since the programs are executed by loading all the program codes from the program storing ROM to the main storage unit for activating the system, the system activation time is restricted by the program size and the memory access time.

(2) Since it takes time to activate the system, a process requiring programs to be executed immediately after power has been turned on (i.e., a process requiring quick response) cannot be performed as required.

(3) Since all the program codes are loaded to the main storage unit 4 at once, the capacity of the main storage unit 4 depends on the size of the program codes.

(4) Since each type of vehicle on which the electronic device is mounted requires a dedicated program storing ROM of its own, if an erasable and rewritable flash memory or the like is used as the program storing ROM and if the size of the program codes is large, an expensive component such as a flash memory or the like is required, and thus the cost is increased.

SUMMARY OF THE INVENTION

Accordingly, the present invention has been made to overcome these problems inherent in the conventional examples, and therefore has an object of the invention to provide an electronic device for executing program codes stored in a main storage unit, which allows system activation time to be reduced by loading only such program codes as requiring quick response to the main storage unit without loading all the program codes, and by executing only such program codes immediately thereafter.

According to the present invention, there is provided an electronic device comprising: an operation processing unit for executing programs; a main storage unit having virtual addresses; a program storage element for storing a plurality of divided program codes and for storing loading program codes for loading the program codes to the main storage unit; an information table storing element for storing an information table having a description of information about the program codes to be loaded from the program storage element to the main storage unit; a map management element having a description of virtual addresses in the main storage unit at which the program codes stored in the program storage element are mapped; and a virtual address decode element for checking a correspondence between a virtual address referenced at the time of the execution of a program and where in the main storage unit the program code corresponding to the program is actually mapped.

In a preferred form of the present invention, the electronic device further comprises an abnormality determiner for detecting the occurrence of an abnormality, and that the program storage element stores an abnormality processing program and the operation processing unit load the abnormality processing program to the main storage unit from the program storage element when the abnormality determiner has detected an occurrence of the abnormality.

In another preferred form of the present invention, the information table includes information about an order in which the program codes are loaded to the main storage unit.

In a further preferred form of the present invention, one of the program codes stored in the program storage element is a real time OS, and the other program codes are divided in terms of each task to be executed.

In a still further preferred form of the present invention, the information table has a description of program codes required to be loaded for each type of vehicle on which the electronic device is to be mounted.

In a yet further preferred form of the present invention, each of the program codes is generated by compiling a source program, and divided in terms of each function.

In a further preferred form of the present invention, each of the program codes has a trigger for loading a next program code.

BRIEF DESCRIPTION OF THE DRAWINGS

In the accompanying drawings:

FIG. 6 is a diagram showing an information table according to a second embodiment of the present invention;

FIG. 8 is a diagram showing an information table according to a third embodiment of the present invention;

DETAILED DESCRIPTION OF THE PREFERRED EMBODIMENTS

Figure 10:
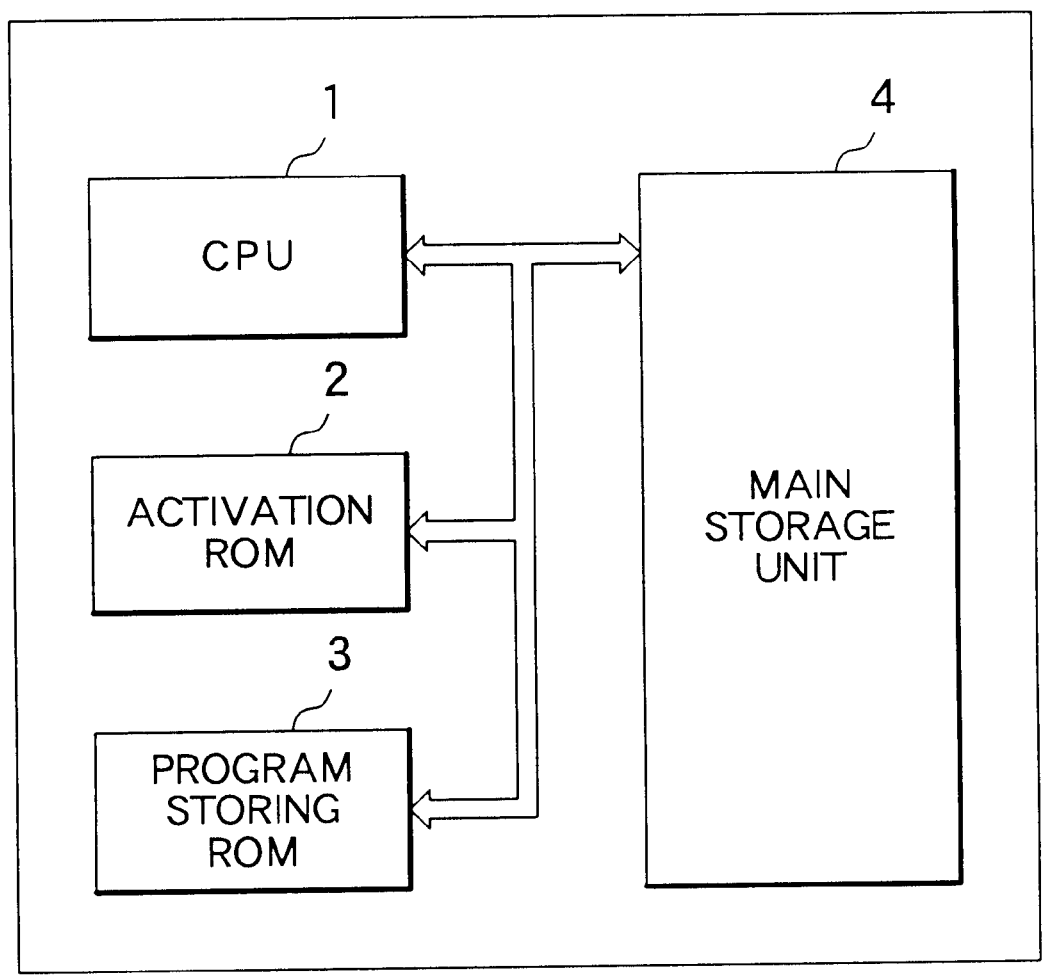
FIG. 10 is a diagram showing the construction of the main portion of a conventional example.
Figure 11:
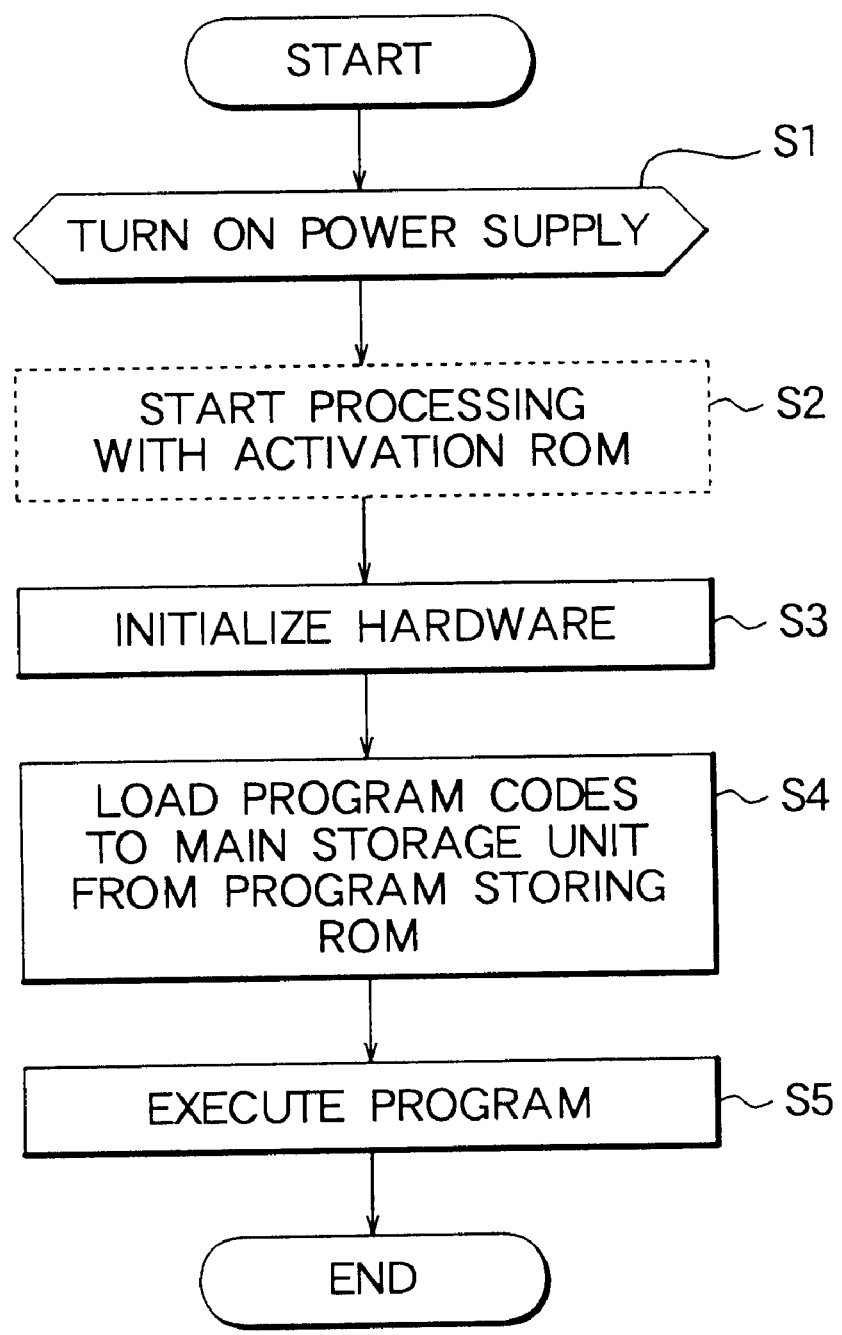
FIG. 11 is a diagram showing the operation of the conventional example.

Embodiments of the present invention will now be described in detail with reference to the accompanying drawings. In the following description, the same parts and components as those of the conventional example shown in FIG. 10 are denoted by the same reference numerals.

First Embodiment

Figure 1:
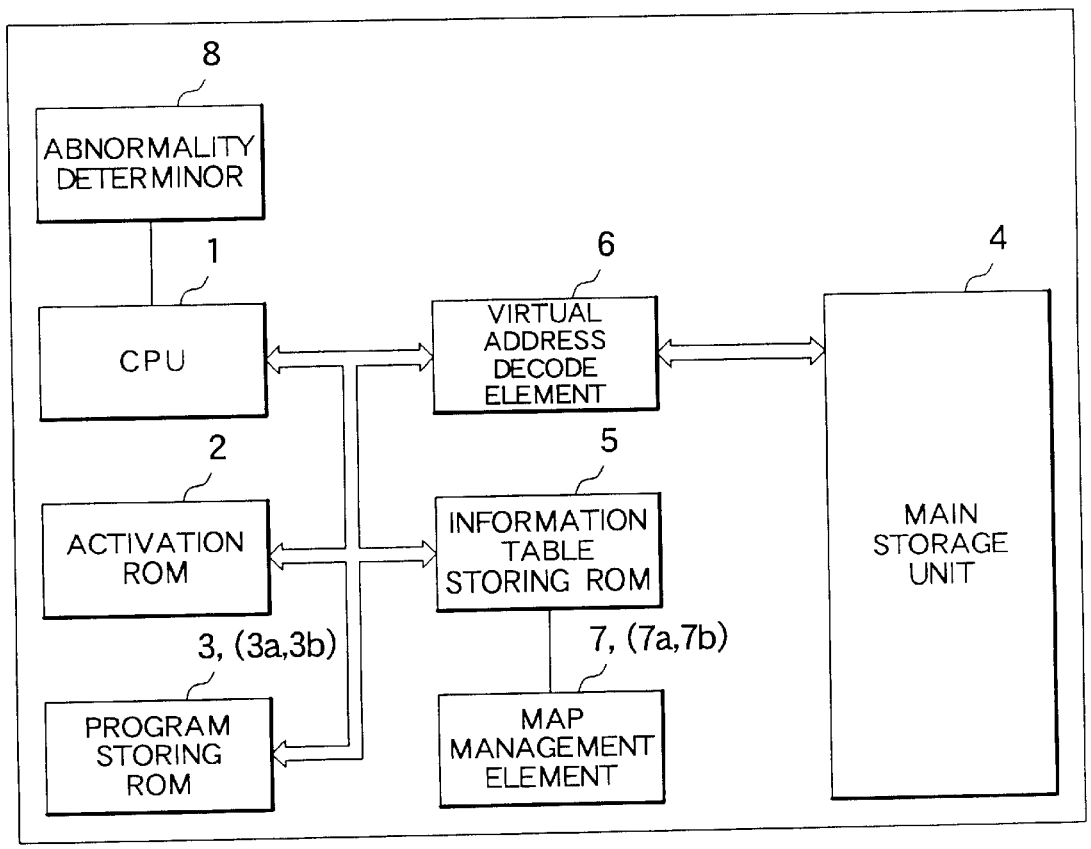
FIG. 1 is a diagram showing the structure of the main portion of an electronic device according to the present invention.

FIG. 1 is a schematic diagram showing the construction of the main portion of an electronic device according to a first embodiment of the present invention. As shown in FIG. 1, the electronic device comprises, likewise the conventional example, a central processing unit (CPU) 1 serving as an operation processing unit, an activation ROM 2, a program storing ROM 3 serving as a program storage element, and a main storage unit 4. The electronic device further comprises an information table storing ROM 5 serving as an information table storage element for storing an information table, a virtual address decode element 6 for checking a correspondence between the virtual address of a program code referred to when a program is executed and where in the main storage unit the program code is actually mapped, a map management element 7 for describing a virtual address at which a program code is mapped, and abnormality determiner 8 for informing the CPU 1 that an abnormality has occurred in a system into which the electronic device is incorporated.

Figure 3:
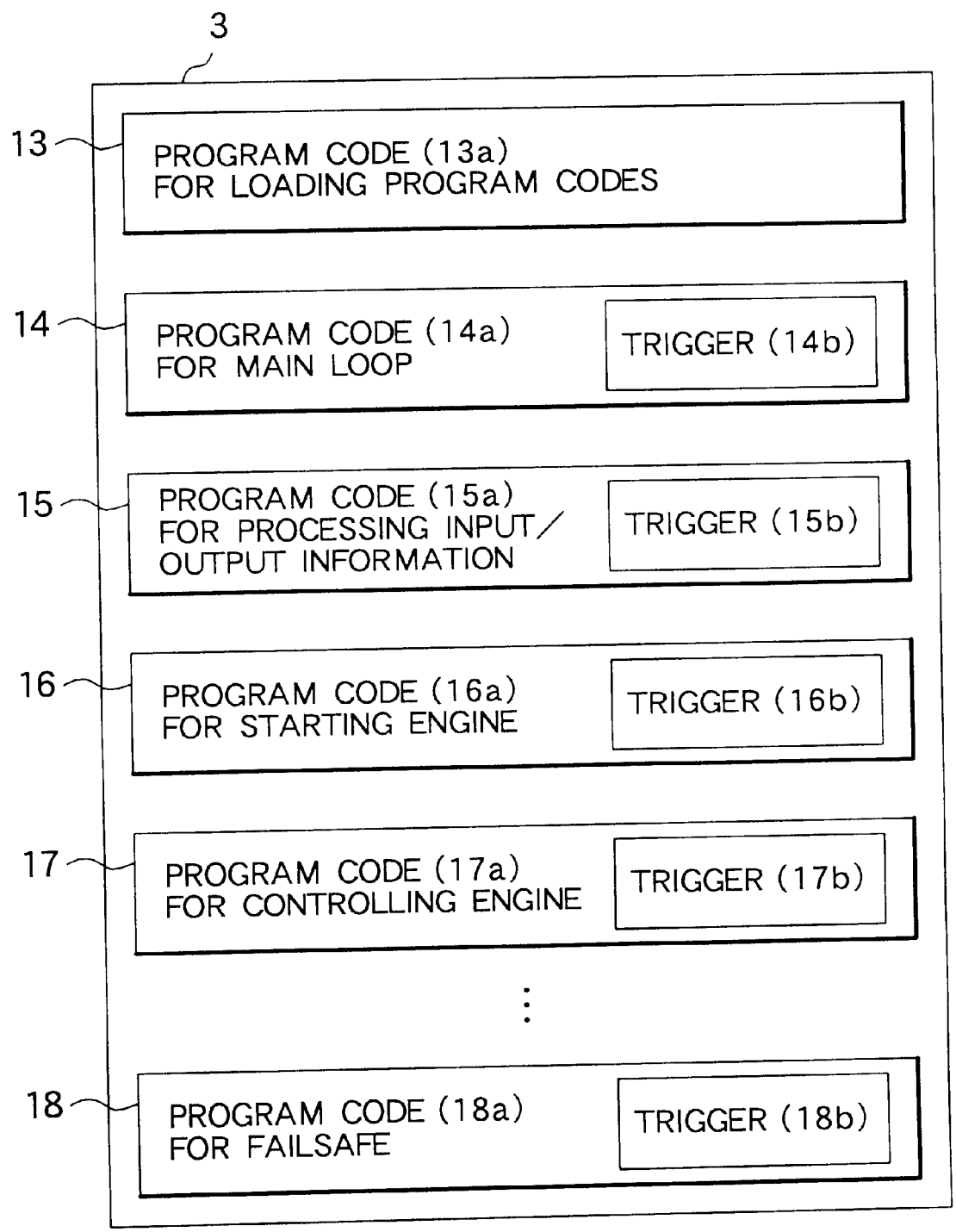
FIG. 3 is a diagram showing the content of a program storing ROM according to the first embodiment of the present invention.

FIG. 3 shows programs stored in the program storing ROM 3. As shown in FIG. 3, the program storing ROM 3 stores a program 13 comprising a program code (13*a*) that loads programs 14 to 18 stored in the ROM 3 to the main storage unit 4. The program 13 is initially loaded to the main storage unit 4 by an activation code stored in the activation ROM 2. The programs 14 to 18 stored in the program storing ROM 3 include program codes (14*a*) to (18*a*) divided in terms of each function or task, and trigger codes (14*b*) to (18*b*) serving as means for providing a trigger that defines a timing for loading the respective program codes (14*a*) to (18*a*) to the main storage unit 4.

Further, the map management element 7 has a description of information about an address in the main storage unit 4 at which a program code for each function of a source program is to be loaded (or mapped), the description being based on link information provided when the program code is generated.

Next, the programs 14 to 18 will be described, taking the case where the present invention is applied to an electronic device for a vehicle as an example. In this example, the program 14 is a program code (14*a*) for a main loop that effects engine control; the program 15 is a program code (15*a*) for processing input/output information about switches, sensors, actuators and the like; the program 16 is a program code (16*a*) for performing an operation process minimally required for starting the engine; the program 17 is a program code (17*a*) for effecting engine control (operation process) when the engine is in the normal state; and the program 18 is a program code (18*a*) that is activated at the time of a fail safe operation.

Figure 2:
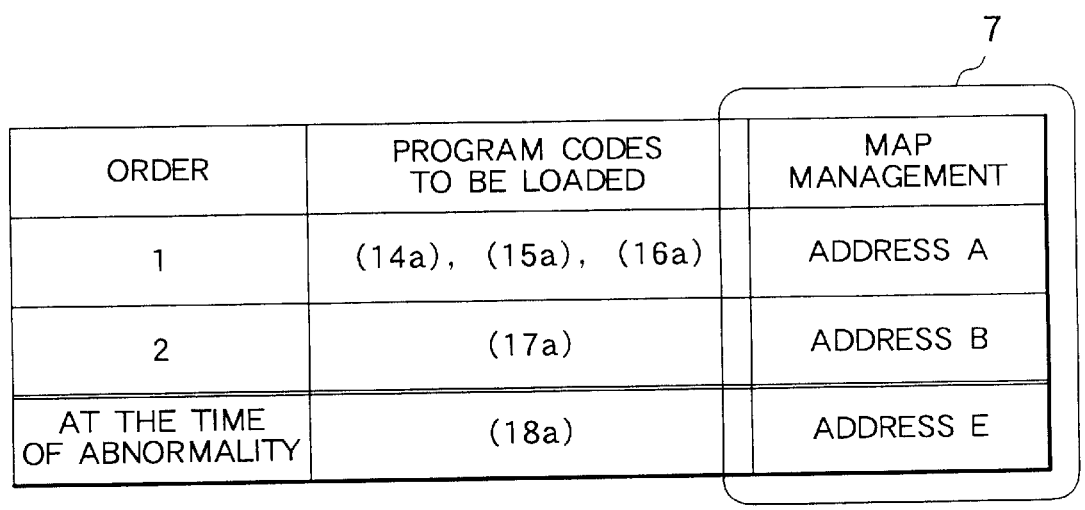
FIG. 2 is a diagram showing an information table according to a first embodiment of the present invention.

In this case, an information table stored in the information table storing ROM 5 is as shown in FIG. 2. That is, the information table has a recording of the names of program codes to be loaded to the CPU 1 from the program storing ROM 3, their loading order and their loading addresses.

Figure 4:
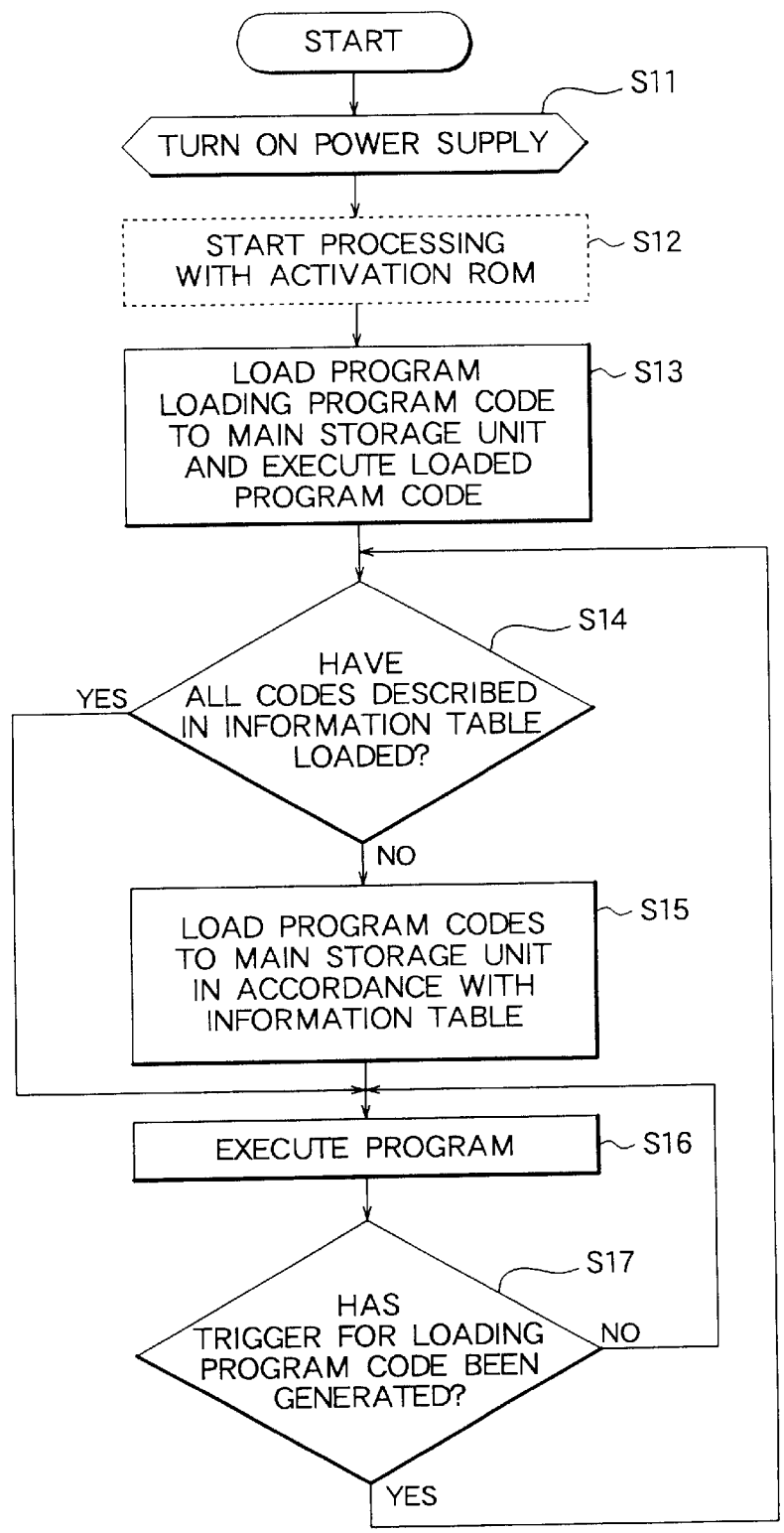
FIG. 4 is a diagram showing the operation of the electronic device according to the present invention when a system into which the device is incorporated is in the normal state.

FIG. 4 is a flowchart showing the operation of the electronic device for a vehicle for activating the system.

Now, the operation of the electronic device for a vehicle for activating the system will be described with reference to the flowchart shown in FIG. 4. First, when power is turned on in step S11, the CPU 1 reads the activation program code from the activation ROM 2, and starts processing in step S12. Then, in step S13, the program code (13*a*) for controlling the loading of the program codes (14*a*) to (18*a*) is loaded to the main storage unit 4 from the program storing ROM 3, and a process of the system is started.

In step S14, it is determined whether or not all the codes described in the information table that is stored in the information table storing ROM 5 are loaded. Since the determination result in step S14 is "NO," immediately after the program code (13*a*) has been read, step S15 will be performed. In step S15, the program codes are sequentially loaded to predetermined addresses in the main storage unit 4 which are described in the map management element 7 in accordance with the order described in the information table shown in FIG. 2. That is, the program code (14*a*) (for the main loop that effects engine control), the program code (15*a*) (for processing input/output information), and the program-code (16*a*) (for performing the operation process minimally required for starting the engine) corresponding to order 1 are sequentially loaded to the virtual address A in the main storage unit 4. Then, in step S16, the program codes thus loaded are executed. Here, the CPU 1 accesses the virtual address decode element 6 using the count of a program counter as its input, and references to the addresses of the program codes actually mapped in the main storage unit 4. Thus, by using the virtual addresses described in the main storage unit 4, the CPU 1 can process data as if the program codes were loaded in the addresses described in the link information.

The engine control is effected at this point of the process. Therefore, in case of the engine start process, for example, which requires rapid execution of a series of preceding process steps from the turning on of the power supply to the system activation, a system having a satisfactory quick response can be constructed because the time required for loading other program codes can be reduced.

Subsequently, in step S17, the trigger code (16*b*) of the program 16 generates a trigger for activating the next load to the loading program code (13*a*) upon start of the engine, and the flow returns to step S14 to perform the process operation therein again. Since the determination result in step S14 is "NO," the program code (17*a*) for controlling the engine at the normal state is loaded to the virtual address B in the main storage unit 4 in step S15, and the program code (17*a*) is executed in step S16.

Since the program code (18*a*) for abnormality processing is not loaded to the main storage unit 4 at this point of the process, the capacity of the main storage unit 4 can be reduced correspondingly, and thus the cost can be reduced.

Figure 5:
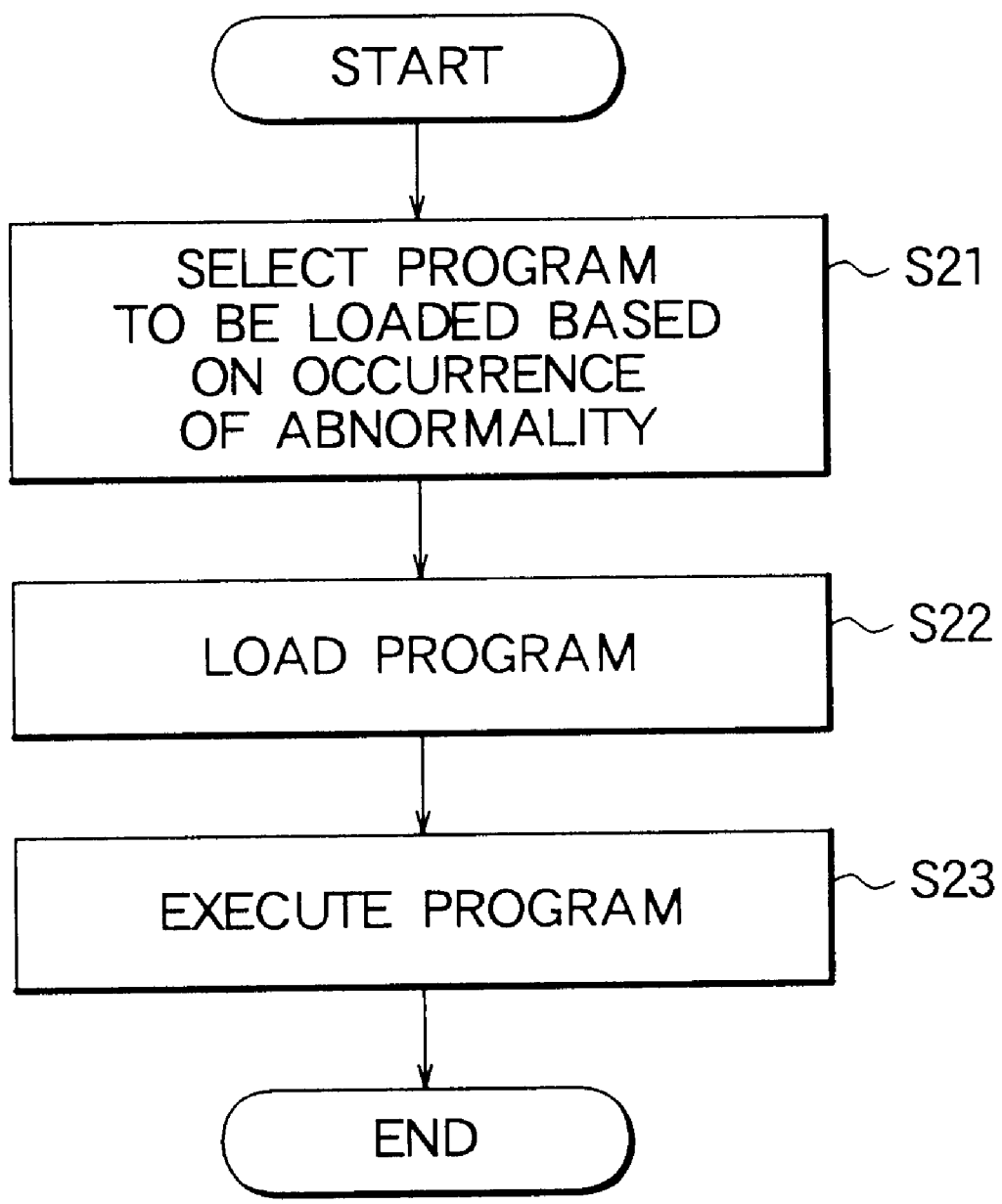
FIG. 5 is a diagram showing the operation of the electronic device according to the present invention when the system is in the abnormal state.

Also, when an abnormality has occurred in the system, the abnormality determiner 8 determines the occurrence of the abnormality, and the CPU 1 performs steps for taking care of the abnormality shown in the flowchart of FIG. 5.

That is, in step S21, the code (18a) of the abnormality processing program (the failsafe program) 18 which is to be loaded next is selected based on an abnormality determination signal from the abnormality determinor 8, and instep S22, the selected program code (18a) is loaded to the virtual address E in the main storage unit 4. Then, in step S23, the failsafe program code (18a) is executed, and the abnormality routine is thereafter terminated.

Second Embodiment

A second embodiment of the present invention will be described, taking the case where the present invention is applied to a vehicle control system as an example. The hardware configuration of the second embodiment is substantially the same as that of the first embodiment except that programs stored in a program storing ROM 3a, the content of an information table stored in the information table storing ROM 5 and the content of the map management element 7a are different from those in the first embodiment.

Figure 7:
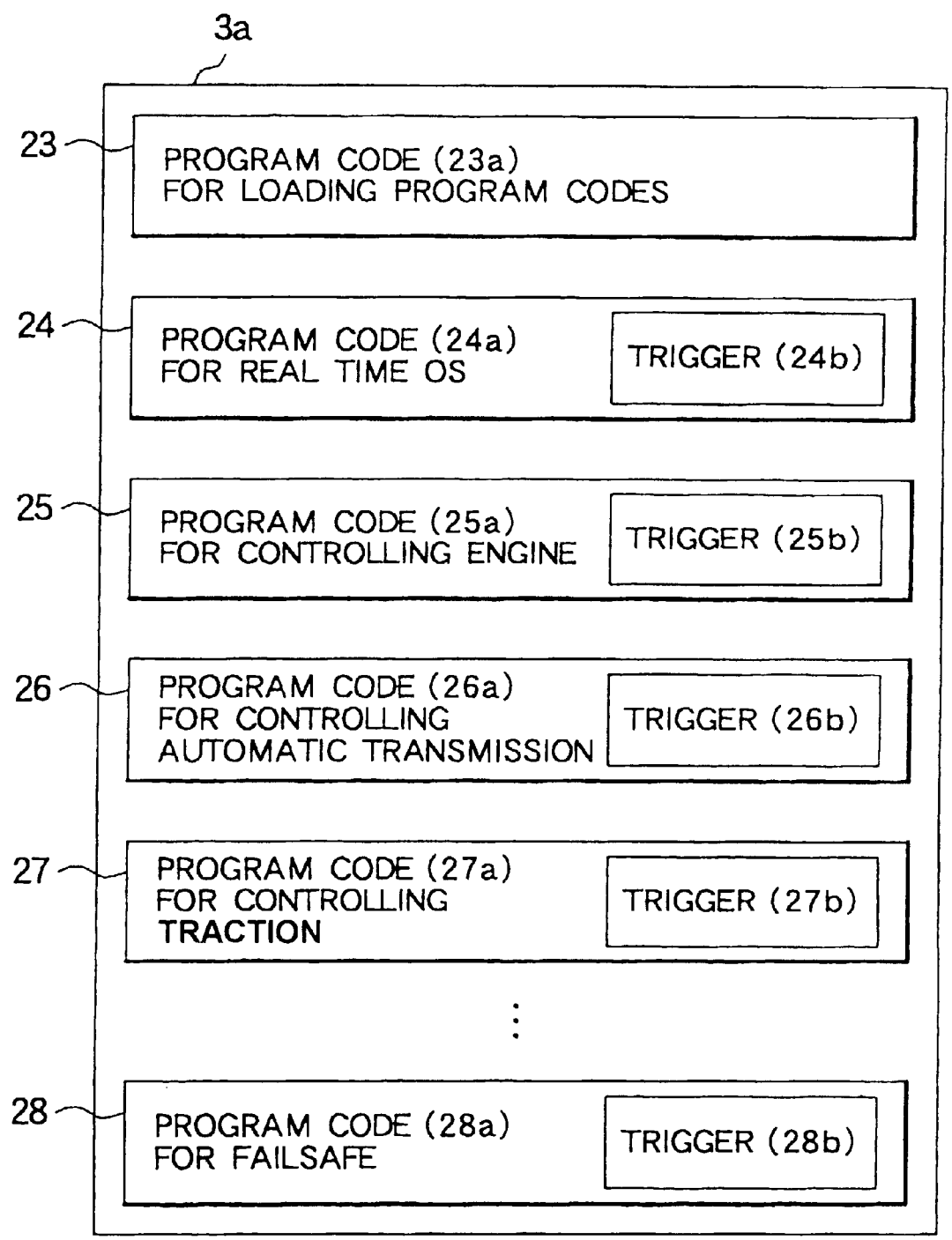
FIG. 7 is a diagram showing the content of a program storing ROM according to the second embodiment of the present invention.

That is, in the second embodiment, as shown in FIG. 7, the program storing ROM 3a stores a real time OS 24 comprising a program code (24a) and a trigger (24b), an engine control application 25 comprising a program code (25a) and a trigger (25b), an automatic transmission control application 26 comprising a program code (26a) and a trigger (26b), a traction control application 27 comprising a program code (27a) and a trigger (27b), and a failsafe application 28 comprising a program code (28a) and a trigger (28b), which is activated at the time of a fail safe operation. At this time, the information table stored in the information table storing ROM 5 is as shown in FIG. 6. That is, the programs are loaded in the order of program codes (24a), (25a), (26a) and (27a), and their loading addresses in the main storage unit 4 are addresses A, B, C and D, respectively.

Next, the operation of the second embodiment will be described with reference to the flowchart shown in FIG. 4. A series of process steps from step S11 in which power is turned on to step S14 in which it is determined whether or not all the codes described in the information table are loaded are the same as those in the first embodiment. Immediately after the power supply has been turned on, the determination result in step S14 is "NO." Thus, in the next step S15, the program code (24a) of the real time OS 24 corresponding to loading order 1 is loaded to the virtual address A in the main storage unit 4 in accordance with the information table shown in FIG. 6, and in step S16, the loaded program code (24a) is executed.

Then, in step S17, the trigger code (24b) of the real time OS 24 generates a trigger for activating the next load to the loading program (24a) upon initialization of the OS 24 itself.

In response to this trigger, the process returns to step S14 to perform the process operation therein again. Since the determination result in step S14 is "NO," the program code (25a) of the engine control application 25 is loaded to the virtual address B in the main storage unit 4 in step S15, and the engine control application 25 is executed in step S16.

The engine control is effected at this timing. Therefore, for a process, such as the engine start process, which requires quick or rapid execution of a series of preceding steps from the turning on of the power supply to the system activation, a system having a satisfactory quick response can be constructed because the time required for loading the program codes of other tasks can be reduced.

Further, in step S17, the trigger code (25b) of the engine control application 25 generates a trigger for activating the next load to the loading program code (23a) upon start of the engine.

In response thereto, the process returns to step S14 to perform the process operation therein again. Since the determination result in step S14 is "NO," the program code (26a) of the automatic transmission control application 26 is loaded to the virtual address C in the main storage unit 4 in step S15, and is executed in step S16.

Then, in step S17, the trigger code (26b) of the automatic transmission control application 26 generates a trigger for activating the next load to the loading program code (23a) upon the start of the task (upon activation of the application).

With the generation of the trigger, the process similarly returns to step S14 to perform the process operation again, and thus steps S14 to S17 are performed. That is, the program code (27a) of the traction control application 27 is loaded to the virtual address D in the main storage unit 4, and executed.

In step S17, the trigger code (27b) of the traction control application 27 generates a trigger for activating the next load to the loading program code (23a) upon start of the task.

Since all the programs stored in the program storing ROM 3a have been loaded this time, the determination result in step S14 is "YES." Thus, the process is continued to step S16 without loading any program, while skipping step S15.

In step S16, the program code (28a) of the failsafe program 28 is not loaded to the main storage unit 4. Therefore, the capacity of the main storage unit 4 can be reduced correspondingly, and thus the cost can be reduced.

Further, when an abnormality has occurred, the abnormality determiner 8 (FIG. 1) makes an abnormality determination, and the process of the CPU 1 performs step S21 of FIG. 5. In step S21, a program to be loaded next is selected based on the condition in which the abnormality has occurred, and in step S22, the program code (28a) of the selected failsafe program 28 is loaded to the virtual address E in the main storage unit 4, and the failsafe program code (28a) is executed in step S23.

Third Embodiment

A third embodiment of the present invention will be described, taking the case where the present invention is applied to the loading of programs for controlling every different type of vehicles as an example. The hardware configuration of the third embodiment is substantially the same as that of the first embodiment except that programs stored in a program storing ROM 3b, the content of an information table stored in the information table ROM 5 and the content of a map management element 7b are different from those in the first embodiment.

Figure 9:
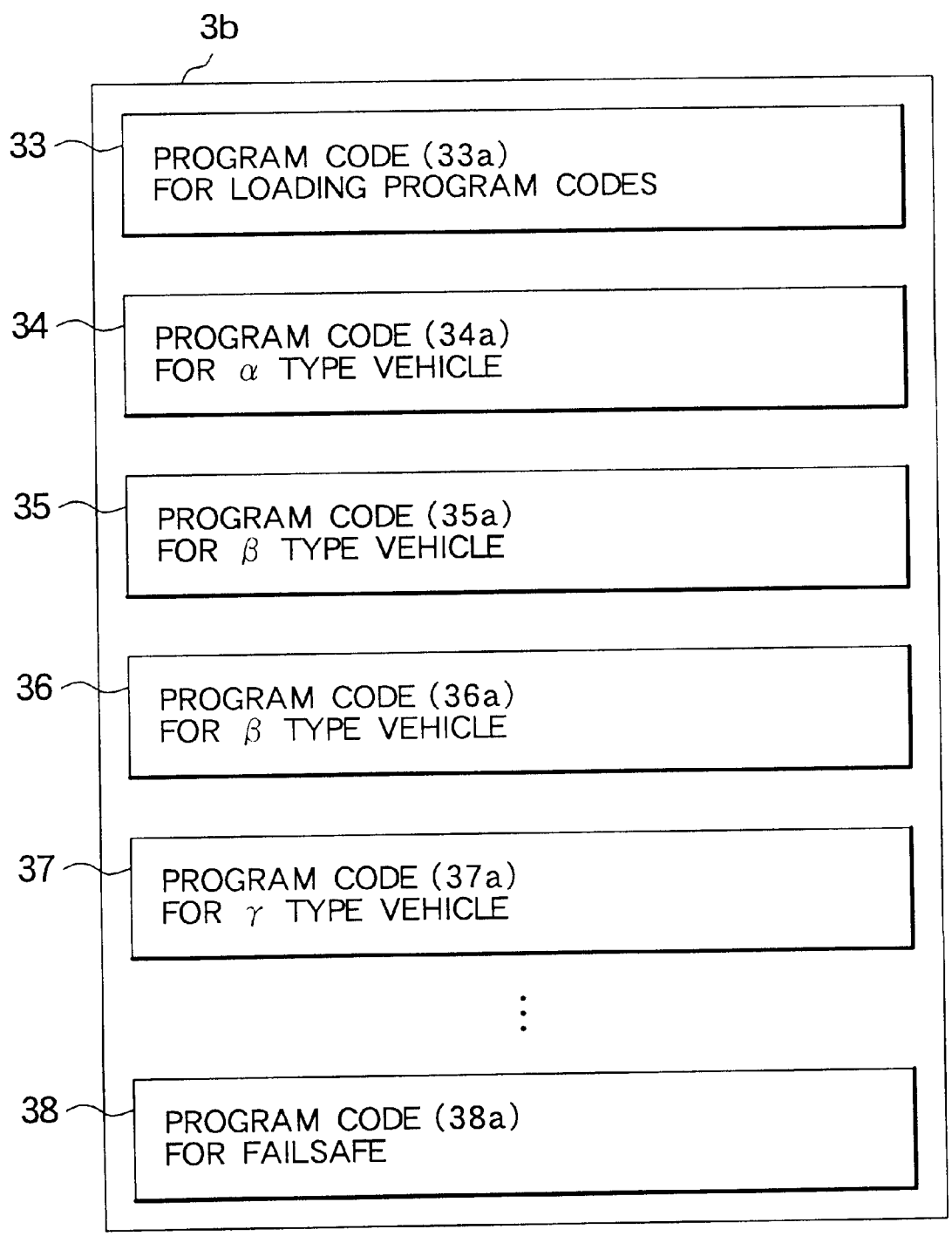
FIG. 9 is a diagram showing the content of a program storing ROM according to the third embodiment of the present invention.

That is, in the third embodiment, as shown in FIG. 9, the program storing ROM 3b stores the program code (33a) of a program code loading program 33, the program code (34a) of a control program 34 for an α type vehicle, the program code (35a) of a first control program 35 for a β type vehicle, the program code (36a) of a second control program 36 for the β type vehicle, the program code (37a) of a control program 37 for a γ type vehicle, and the program code (38a) of a failsafe program 38. In this case, the programs 34 to 37 do not generate a trigger for controlling the next load. Further, the information table stored in the information table storing ROM 5 is as shown in FIG. 8. That is, the information table has a description of the program codes required for loading the programs per type of vehicle on which the electronic device of the present invention is mounted. For example, the program to be loaded to the α type vehicle comprises the program code (34a); the programs to be loaded to the β type vehicle comprise the program codes (35a and 36a); and the program to be loaded to the γ type vehicle comprises the program code (37a). The program codes corresponding to the types of vehicles on which the present electronic device is mounted are loaded to the virtual address A in the main storage unit 4 and the fail safe program code (38a) is loaded to the virtual address E in the main storage unit 4 for each type of vehicle in accordance with the content described in the map management element 7b.

Next, the operation of the third embodiment will be described with reference to the flowchart shown in FIG. 4. A series of process steps from step S11 in which the power is turned on to step S14 in which it is determined whether or not all the codes described in the information table are loaded are the same as those in the first embodiment. First of all, the case where the electronic device is mounted on the α type vehicle will be described. Immediately after the power supply has been turned on, the determination result in step S14 is "NO." Thus, in step S15, the program code (34a) corresponding to the α type vehicle is loaded to the virtual address A in the main storage unit 4 in accordance with the information table shown in FIG. 8, and in step S16, the loaded program code (34a) for the α type vehicle is executed. Note that step S17 of FIG. 4 does not exist in the third embodiment, and the operation is terminated after step S16 has been performed.

Further, when an abnormality has occurred in the device-incorporated system, the abnormality determiner 8 (FIG. 1) makes an abnormal determination, and the CPU 1 performs step 21 of FIG. 5. In step S21, the program to be loaded next is selected based on the condition in which the abnormality has occurred. In step S22, the program code (28a) of the selected failsafe program 28 is loaded to the virtual address E in the main storage unit 4, and the failsafe program code (28a) is executed in step S23.

On the other hand, when the type of vehicle is changed, the information table is searched in accordance with the desired type number as a key, and a program code corresponding to the desired type number is loaded. Therefore, the loading operation of a plurality of types of vehicles can be accommodated without changing the program codes stored in the program storing ROM 3. Further, since the size of the information table storing ROM 5 that needs to be changed is small, an inexpensive ROM having a small capacity can be used, and thus the cost can be reduced.

As described in the foregoing, according to the present invention, only those program codes that are essentially required at the time of system activation are loaded and executed. Therefore, the time for loading the program codes from the program storage element to the main storage unit can be reduced, and thus the system activation time can be reduced.

Further, the program codes are divided, and the order in which the program codes are to be loaded can be defined in the information table. Therefore, a process requiring quick response can be performed promptly, immediately after the corresponding program codes are loaded.

Still further, only essentially required program codes may need to be loaded to the main storage unit. Therefore, the frequency of use of the main storage unit can be reduced and the required capacity of the main storage unit can thus be reduced. As a result, the cost of the system can be reduced.

Still further, by allowing only the information table to be changed, an expensive component such as a flash ROM can be used as the information table storing element dedicated only to storing an information table to thereby reduce the required storage capacity of the information table storage element. As a result, the cost can be kept low. In addition, by changing the program code to be loaded for each type of vehicle in accordance with the information table, the program storage element can be implemented by using a single inexpensive ROM, and thus the cost of the system can be reduced.

What is claimed is:

1. An electronic device comprising:
    an operation processing unit for executing programs;
    a main storage unit having virtual addresses;
    a program storage element for storing a plurality of divided program codes and for storing loading program codes for loading said program codes to said main storage unit;
    an information table storing element for storing an information table having a description of information about said program codes to be loaded from said program storage element to said main storage unit;
    a map management element having a description of virtual addresses in said main storage unit at which said program codes stored in said program storage element are mapped; and
    a virtual address decode element for checking a correspondence between a virtual address referenced at the time of the execution of a program and where in said main storage unit said program code corresponding to the program is actually mapped.

2. An electronic device according to claim 1, further comprising an abnormality determinor for detecting the occurrence of an abnormality, wherein
    said program storage element stores an abnormality processing program; and
    said operation processing unit loads the abnormality processing program to said main storage unit from said program storage element when said abnormality determiner has detected an occurrence of an abnormality in a system coupled to said device.

3. The electronic device of claim 2, wherein said system comprises an automotive system.

4. An electronic device according to claim 1, wherein said information table includes information about an order in which said program codes are loaded to said main storage unit.

5. An electronic device according to claim 1, wherein one of said program codes stored in said-program storage element is a real time OS, and the other program codes are divided in terms of each task to be executed.

6. An electronic device according to claim 1, wherein said information table has a description of program codes required to be loaded for each type of vehicle on which said electronic device is to be mounted.

7. An electronic device according to claim 5, wherein each of said program codes is generated by compiling a source program, and divided in terms of each function.

8. An electronic device according to claim 1, wherein each of said program codes has a trigger for loading a next program code.

9. The electronic device of claim 1, wherein said divided program codes comprise codes that perform at least one of:
    engine control;
    processing of input/output information about at least one of switches, sensors and actuators;
    starting an engine; and
    controlling engine operation in a normal engine state.

* * * * *